US010765100B2

(12) United States Patent
Schlein et al.

(10) Patent No.: US 10,765,100 B2
(45) Date of Patent: Sep. 8, 2020

(54) ATTRACTANTS AND BAIT STATIONS COMPRISING DATE-DERIVED SYRUP PRODUCTS FOR ATTRACTING FLIES AND METHODS THEREIN

(71) Applicant: Westham Ltd., Tel Aviv (IL)

(72) Inventors: Yosef Schlein, D.N. Merom HaGalil (IL); Miri Barak-Simchoni, Jerusalem (IL)

(73) Assignee: WTO INVESTMENTS, LLC, Dallas, TX (US)

( * ) Notice: Subject to any disclaimer, the term of this patent is extended or adjusted under 35 U.S.C. 154(b) by 0 days.

(21) Appl. No.: 15/115,922

(22) PCT Filed: Jan. 19, 2015

(86) PCT No.: PCT/IL2015/050060
§ 371 (c)(1),
(2) Date: Aug. 2, 2016

(87) PCT Pub. No.: WO2015/114619
PCT Pub. Date: Aug. 6, 2015

(65) Prior Publication Data
US 2017/0164596 A1    Jun. 15, 2017

(30) Foreign Application Priority Data

Feb. 2, 2014 (IL) .......................................... 230774

(51) Int. Cl.
*A01M 1/02* (2006.01)
*A01M 1/10* (2006.01)
*A01M 1/14* (2006.01)
*A01N 25/00* (2006.01)

(52) U.S. Cl.
CPC .............. *A01M 1/02* (2013.01); *A01M 1/106* (2013.01); *A01M 1/14* (2013.01); *A01N 25/006* (2013.01); *Y02A 50/371* (2018.01); *Y02A 50/373* (2018.01)

(58) Field of Classification Search
CPC    A01M 1/00; A01M 1/02; A01M 1/20; A01M 1/2005; A01M 1/2011; A01M 1/2016
USPC ................................ 43/132.1, 131, 124, 107
See application file for complete search history.

(56) References Cited

U.S. PATENT DOCUMENTS

| 3,605,321 | A | * | 9/1971 | Lazarus | A01M 1/2055 43/131 |
| 4,205,066 | A | * | 5/1980 | Hennart | A01N 25/006 424/84 |
| 4,322,862 | A | * | 4/1982 | Beuthling | A01K 53/00 449/48 |
| 4,849,216 | A | * | 7/1989 | Andersen | A01N 25/006 424/84 |
| 4,850,305 | A | * | 7/1989 | Georgi | A01K 67/033 119/303 |
| 5,133,289 | A | * | 7/1992 | Georgi | A01K 67/033 119/6.6 |
| 5,359,808 | A | * | 11/1994 | Fitsakis | A01M 1/2016 43/131 |
| RE35,348 | E | * | 10/1996 | Georgi | A01K 67/033 119/6.6 |
| 5,683,687 | A | * | 11/1997 | Marin | A01N 49/00 424/405 |
| 6,190,653 | B1 | * | 2/2001 | Landolt | A01N 31/02 424/405 |
| 6,344,191 | B2 | * | 2/2002 | Landolt | A01N 31/02 424/405 |
| 6,601,337 | B1 | * | 8/2003 | McKenney, Sr. | A01M 1/02 43/132.1 |
| 6,718,689 | B1 | * | 4/2004 | Kolibas | A01M 1/2005 43/131 |
| 7,048,918 | B2 | * | 5/2006 | Warner | A01M 1/2011 424/660 |

(Continued)

FOREIGN PATENT DOCUMENTS

| CN | 2181179 Y | | 10/1994 |
| CN | 1934957 A | * | 3/2007 |
| WO | WO2016009981 A1 | | 1/2016 |

OTHER PUBLICATIONS

Foster, Woodbridge A., "Mosquito Sugar Feeding and Reproductive Energetics", Annual Review of Entomology, vol. 40, 1995; Available web site: http://www.annualreviews.org/doi/pdf/10.1146/annurev.en.40.010195.002303; downloaded on Aug. 2, 2017.*

Geden et al., "Evaluation of commercial and field-expedient baited traps for house flies, Musca domestica L. (Diptera: Muscidae)", Journal of Vector Ecology, vol. 34, No. 1, Jan. 9, 2009; Available web site: http://onlinelibrary.wiley.com/doi/10.1111/j.1948-7134.2009.00012.x/pdf; downloaded on Aug. 2, 2017.*

D.L. Kline, W. Takken, J.R> Wood, D.A. Carlson. Field studies of the potential of butanone, carbon dioxide, honey extract, I-octen-3-01, L-lactic acid and phenols as attractants for mosquitoes. Med. Vet. Entomot. 4:383-91; 1990 (Ref.98—Foster 1995).

(Continued)

*Primary Examiner* — Darren W Ark

(74) *Attorney, Agent, or Firm* — Reuven K. Mouallem, LL.M.; FlashPoint IP Ltd.

(57) ABSTRACT

The present invention discloses attractants and bait stations comprising date-derived syrup products for attracting biting flies and methods therein. The methods including the steps of: providing a bait station including: a date-derived syrup product for attracting at least one type of biting fly selected from the group consisting of: mosquitoes, sand flies, stable flies, biting midges, and stomoxys; and a substrate material for supporting the date-derived syrup product; and locating the bait station in a designated geographic area in order to attract said at least one type of biting fly. Preferably, the date-derived syrup product is derived from at least one date material selected from the group consisting of: dates, date paste, date syrup obtained from pressed dates, and commercially-available date syrup.

21 Claims, No Drawings

(56) References Cited

U.S. PATENT DOCUMENTS

| | | | | |
|---|---|---|---|---|
| 8,420,070 | B2* | 4/2013 | Simchoni-Barak | A01M 1/023 424/84 |
| 9,089,122 | B2* | 7/2015 | Olson | A01M 1/023 |
| 9,220,255 | B2* | 12/2015 | Halahmi | A01M 1/2005 |
| 9,693,561 | B2* | 7/2017 | Mafra-Neto | A01N 25/006 |
| 10,561,127 | B2* | 2/2020 | Massaro | A01K 67/033 |
| 2004/0208953 | A1* | 10/2004 | Heath | A01N 25/006 426/1 |
| 2007/0148202 | A1* | 6/2007 | Primo Yufera | A01N 25/006 424/410 |
| 2010/0192451 | A1* | 8/2010 | Ponnusamy | A01N 37/02 43/114 |
| 2012/0145081 | A1* | 6/2012 | Acar | A01K 67/033 119/6.5 |
| 2013/0302269 | A1* | 11/2013 | Gomez | A01N 25/10 424/84 |
| 2016/0135451 | A1* | 5/2016 | Gomez | A01N 25/10 424/84 |
| 2019/0345310 | A1* | 11/2019 | Larsen | A01M 1/2005 |
| 2019/0364885 | A1* | 12/2019 | Tran | A01M 1/2005 |
| 2020/0015470 | A1* | 1/2020 | Muller | A01M 1/2016 |

OTHER PUBLICATIONS

W.K. Reisen, R.P. Meyer, M.M. Milby, Patterns of fructose feeding by Culex tarsalis (Diptera: Culicidae). J. Med. Entomol. 23:366-73; 1986 (Ref.174—Foster 1995).

M. F. Bowen, Patterns of sugar feeding in diapausing and nondiapausing Culex pipiens (Diptera: Cilicidae) Females; J. Med. Entomol. 29(5): 843-849; 1992 (Ref.16—Foster 1995).

R.G. Hancock, W. A. Foster, Effect of preblood-meal sugar on sugar seeking and upwind flight by gravid and parous Aedes aegypti (Diptera: Culicidae). J. Med. Entomol. 30:353-59; 1993 (Ref.70—Foster 1995).

T. P. Healy, P.C. Jepson, The location of floral nectar sources by mosquitoes: the long-range responses of Anopheles arabiensis Patton (Diptera: Culicidae) to Achillea millefolium flowers and isolated floral odor. Bull. Entomol. Res. 78:651-57;1988; Abstract (Ref.79—Foster 1995).

P.C. Jepson, T.P. Healy, The location of floral nectar sources by mosquitoes: an advanced bioassay for volatile plant odours and initial studies with Aedes aegypti (L.) (Diptera: Culicidae). Bull. Entomol. Res. 78:641-50; 1988; Absract (Ref.87—Foster 1995).

A.J. Thorsteinson, R.A. Brust, The influence of flower scents on aggregations of caged adult Aedes aegypti. Mosq. News 22:349-51; 1962 (Ref.202—Foster 1995).

A. M. Vargo, W.A. Foster. Responsiveness of female Aedes aegypti (Diptera: Culicidae) to flower extracts. J. Med. Entomol. 19:710-18; 1982 (Ref.212—Foster 1995).

R.J.D. Wensler, The effect of odors on the behavior of adult Aedes aegypti and some factors limiting responsiveness. Can. J. Zool. 50:415-20; 1972 (Ref.217—Foster 1995).

Josef SR. (1970) "Fruit feeding of musquitoes in nature". Proc Annu. Meeting, N.J. Mosq. Exterm. Assoc. 57:25-131. Abstract only.

Theobald FV. (1901) Monograph of the Culicidoe of Mosquitoes, vol. 1, London: Clowes & Sons, p. 69 only.

\* cited by examiner

ATTRACTANTS AND BAIT STATIONS COMPRISING DATE-DERIVED SYRUP PRODUCTS FOR ATTRACTING FLIES AND METHODS THEREIN

FIELD AND BACKGROUND OF THE INVENTION

The present invention relates to attractants and bait stations comprising date-derived syrup products (defined herein as being made of and/or derived from dates, date paste, and/or date syrup contained therein) for attracting flies (particularly biting flies, fruit flies, filth flies, and houseflies) and methods therein.

Biting flies (including mosquitoes, sand flies, stable flies, and biting midges) are known for their blood-feeding behavior, which makes them vectors of pathogens. However, while female biting flies predominantly need blood for egg production, and sugar as their main source of energy, male biting flies (apart from Stomoxys) do not feed on blood, and are completely dependent on sugar (Killick-Kendrick, 1999; Foster, 1995, see full reference in Literature section).

Therefore, the requirement for sugar-feeding influences longevity, fecundity, dispersal, host-seeking behavior, and ultimately blood-feeding that facilitates disease transmission (Foster, 1995; Dye, 1987; Gibb et al., 1988; Müller & Schlein, 2004). According to the literature, biting flies obtain sugar meals from flowers and honeydew excreted by aphids and coccids, fruit, and to a smaller extent from green plant tissue of leaves and stems (MacVicker et al., 1990; Wallbanks et al., 1991; Schlein & Müller, 1995).

Biting flies do not find sugar sources randomly; they rather search for sugar sources actively by following olfactory cues (Foster, 1995; Müller et al., 2010; Schlein & Müller, 2010). Some observations indicate that biting flies are selective and visit different flowers and fruit according to an order of preference (Müller & Schlein, 2006; Schlein & Müller, 2008). Despite the obvious importance, there is only anecdotal information on specific sugar-meal sources, and little is known about preferences of sugar sources in the field (Foster, 1995).

This dependence on sugar of biting flies was only recently exploited for control measurements. In recent times, attractive, toxic, sugar baits were developed to attract and kill biting flies in the field. These baits basically include an attractive component, sugar as a feeding stimulant, and an oral toxin. Currently, bait stations are one of the most interesting and promising insect control techniques.

In such prior-art studies, in the absence of a suitable attractant, a non-attracting, toxic sugar solution was initially sprayed on flowering plants. Mosquitoes were attracted by the scent of the flowers, and fed on the sugar solution, consequently resulting in death. While effective in controlling mosquitoes, this method required bait application to be dependent on locating suitable flowering plants. Furthermore, the impact on "non-target" flower-visiting insects such as bees and other pollinators was very high.

In subsequent studies, extracts of numerous attractive flowers and fruits were used to attract blood-sucking Diptera to the toxic sugar bait. Candidates of flowering plants and fruit were screened for their attracting properties to biting flies. Attractants for control experiments were made from identified attractive fruits including guava, plum, honeydew melon, cactus fruit, and carob seedpods. Though the performance of such attractants was initially satisfactory, it was determined that flies were only attracted to such fruit if very ripe or even over-ripe fruit (prior to the onset of rot) was used.

Fermenting the fruit with wine or beer for a few days mitigated this limitation. The resulting attractants proved to be highly effective for the control of flies; however, the same attractants exhibited poor long-term stability in field studies, as well as poor shelf life for a commercializable product. Furthermore, the availability of over-ripe fruit in industrial quantities with a persistent quality, and the standardization of the fermentation process posed additional problems. In addition, fermented fruit and their extracted products attracted not only biting flies, but also non-target insects in some areas such as non-biting Diptera, Hymenoptera, and Lepidoptera.

Furthermore, since typical prior-art bait is a viscous substance or aqueous-gel mixture, a major drawback of prior-art bait technologies is the sensitivity to outdoor environments, such as sunlight, dust, rain, dew, and cold flow due to gravity. Cold flow of bait causes loss of material and uneven distribution along the dimensions of the bait. Baits having no outer, protective film tend to accumulate dust that sticks to the bait, while the sunlight's radiation (particularly in the UV range) can cause severe degradation over a period of time of outdoor exposure.

It would be desirable to have attractants and bait stations comprising date-derived syrup products for attracting flies. Such attractants and methods would, inter alia, overcome the limitations mentioned above.

SUMMARY

It is the purpose of the present invention to provide attractants and bait stations comprising date-derived syrup products for attracting flies (particularly biting flies, fruit flies, filth flies, and houseflies) and methods therein.

In the interest of clarity, several terms which follow are specifically defined for use herein. The term "date-derived syrup products" is used herein to refer to syrup products that are made of and/or derived from dates, date paste, and/or date syrup contained therein. The terms "fresh" and "freshly-prepared" are used herein to refer to attractants that were exposed to a test environment shortly after the attractants were prepared.

The term "dates" is used herein to refer to the Genus Phoenix L.—date palm. Family Arecaceae, the main species *Phoenix dactylifera* L., and others: *P. atlantica* A. Chev., *P. canariensis* Chabeaud., *P. reclinata* Jacq., *P. sylvestris* Roxb., *P. humilis* Royle., *P. hanceana* Naudin., *P. robelinic* O'Brein., *P. farinifera* Roxb., *P. rupicola* T. Anders., *P. acaulis* Roxb., and *P. paludosa* Roxb.

In particular, the term "dates" includes species that bear edible fruit for humans or animals (*P. atlantica* Chev., *P. reclinata* Jacq., *P. farinifera* Roxb., *P. humilis* Royle., and *P. acaulis* Roxb). The definition of dates further includes the direct descendent species: *P. canariensis* Chabeaud—Canary Island date palm; *P. dactylifera* L.—date palm; *P. loureiroi* Kunth—Loureir's date palm; *P. reclinata* Jacq.—Senegal date palm, reclining date palm; *P. roebelenii* O'Brien—pygmy date palm; and *P. sylvestris* (L.) Roxb.—wild date palm. Obviously, different types of fruit with different nomenclature and an array of different cultivars with their local names are also included in the present definition of dates.

The term "flies" is used herein to refer to biting flies, species of fruit flies, filth flies, and houseflies. Examples of biting flies include mosquitoes, sand flies, stable flies, and biting midges. The term "non-target" insect is used herein to refer to any insect not included in the term "flies" for which it is deemed undesirable and/or unintended for an attractant to attract. The term "bait station" is used herein to refer to a device that is installed in a way that the targeted insects can feed on the bait, either outdoors or indoors.

Furthermore, it is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Currently, there is no evidence that flies are attracted or feed upon date-derived syrup products. Embodiments of the present invention provide attractants, bait stations, and associated methods comprising date-derived syrup products for which flies are preferentially attracted to.

Many insect baits have characteristic liquid properties; thus, such baits are subject to sagging and gravity-driven loss from a reservoir or bait surface. Furthermore, the bait needs to make the food source (e.g., sugar) available to the insects; thus, a tacky exposed surface is often employed, which can quickly build up debris from dust and dead insects adsorbed/attached to the surface. Such debris can result in blocking a large portion of the bait surface, thereby reducing its effectiveness. Exposure to rain can also degrade bait performance by causing loss or deterioration of the bait itself.

Preferred embodiments of the present invention provide bait stations characterized, inter alia, by: improved rain erosion resistance, lower surface tack, and reduced sagging and tendency to cold flow due to gravity.

Furthermore, preferred embodiments of the present invention provide date-derived attractants, which exhibit sustained, long-term effectiveness. Such date-derived attractants are readily available in bulk, need no special preservation, and can be stored for long periods of time. Such date-derived attractants can also be combined with simple traps and trapping mechanisms. Sugar as an additional food source can be added to the date-derived attractants as well without interfering with attraction performance.

Moreover, preferred embodiments of the present invention provide such date-derived attractants which overcome, inter alia, the disadvantages associated with other fruit-based attractants which: (1) require the fruit to be in a narrowly-defined state of ripeness, (2) limit the availability of industrial quantities of product due to seasonal variation in regional harvests, (3) have complicated preservation and storage options, and (4) limit the length of product usability due to a short shelf-life.

Therefore, according to the present invention, there is provided for the first time a method for attracting flies, the method comprising the steps of: (a) providing a bait station including: (i) a date-derived syrup product for attracting the flies; and (ii) a substrate material for supporting the date-derived syrup product; and (b) locating the bait station in a designated geographic area in order to attract the flies.

Preferably, the date-derived syrup product is derived from at least one date material selected from the group consisting of: dates, date paste, date syrup obtained from pressed dates, and commercially-available date syrup.

Preferably, the date-derived syrup product includes an added sugar as a food source for the flies.

Preferably, the substrate material is at least one material selected from the group consisting of: mechanically-roughened material, reinforced cardboard, plastic, high surface-area material, woven functional fabric, functional mesh, open-pore foam, fibrous mat, corrugated material, honeycomb fabricated material, green vegetation, and foliage.

Preferably, the substrate material is a fibrous material for adsorbing and/or absorbing the date-derived syrup product to cause slow release of the date-derived syrup product into the environment.

Preferably, the date-derived syrup product is suffused into the substrate material.

Preferably, the bait station further includes: (iii) a protective film for providing the flies access to the date-derived syrup product.

Most preferably, the protective film is adapted to be permeable to volatile components.

Most preferably, the protective film is configured to be piercable by the flies.

Most preferably, the protective film is configured to be resistant to degradation caused by outdoor environmental conditions and/or harsh indoor environmental conditions.

According to the present invention, there is provided for the first time a method for attracting flies in a designated location, the method comprising the steps of: (a) setting a location based on the presence of green vegetation or foliage; and (b) applying a date-derived syrup product onto the green vegetation or foliage for attracting the flies in the designated location.

Preferably, the applying is at least one technique selected from the group consisting of: spraying, immersing, smearing, misting, pouring, and dripping.

Preferably, the date-derived syrup product is derived from at least one date material selected from the group consisting of: dates, date paste, date syrup obtained from pressed dates, and commercially-available date syrup.

Preferably, the date-derived syrup product includes an added sugar as a food source for the flies.

According to the present invention, there is provided for the first time a bait station for attracting flies, the bait station comprising: (a) a date-derived syrup product for attracting the flies; and (b) a substrate material for supporting the date-derived syrup product.

Preferably, the date-derived syrup product is derived from at least one date material selected from the group consisting of: dates, date paste, date syrup obtained from pressed dates, and commercially-available date syrup.

Preferably, the date-derived syrup product includes an added sugar as a food source for the flies.

Preferably, the substrate material is at least one material selected from the group consisting of: mechanically-roughened material, reinforced cardboard, plastic, high surface-area material, woven functional fabric, functional mesh, open-pore foam, fibrous mat, corrugated material, honeycomb fabricated material, green vegetation, and foliage.

Preferably, the substrate material is a fibrous material for adsorbing and/or absorbing the date-derived syrup product to cause slow release of the date-derived syrup product into the environment.

Preferably, the date-derived syrup product is suffused into the substrate material.

Preferably, the bait station further comprising: (c) a protective film for providing the flies access to the date-derived syrup product.

Most preferably, the protective film is adapted to be permeable to volatile components.

Most preferably, the protective film is configured to be piercable by the flies.

Most preferably, the protective film is configured to be resistant to degradation caused by outdoor environmental conditions and/or harsh indoor environmental conditions.

According to the present invention, there is provided for the first time an attractant for attracting flies, the attractant comprising: (a) a date-derived syrup product for attracting the flies, the date-derived syrup product adapted to selectively attract flies while discriminately not attracting non-target insects.

Preferably, the date-derived syrup product is derived from at least one date material selected from the group consisting of: dates, date paste, date syrup obtained from pressed dates, and commercially-available date syrup.

Preferably, the date-derived syrup product includes an added sugar as a food source for the flies.

Preferably, the date-derived syrup product includes an added water-based solvent.

These and further embodiments will be apparent from the detailed description and examples that follow.

DESCRIPTION OF THE PREFERRED EMBODIMENTS

The present invention relates to attractants and bait stations comprising date-derived syrup products for attracting flies and methods therein. The principles and operation for providing such attractants, bait stations, and methods, according to the present invention, may be better understood with reference to the accompanying description. Exemplary embodiments of the present invention are detailed below in the following experimental studies and results.

Experimental Conditions

Field Study Site

Field studies were conducted in Neot Hakikar, in Southern Israel, the largest natural oasis along the Western shore of the Dead Sea. The area is an extreme desert with occasional natural oases consisting of marshland, and artificial oases formed by agricultural irrigation: the conditions in these sites are tropical. The Eastern part of the study oasis is mainly used for agriculture. In the Western part, there is a large, non-irrigated, date plantation. This plantation covers an area of approximately 10 hectares and is surrounded mainly by reed thickets. Chenopodiaceae shrubs, and *Tamarix* bushes. The vegetation between the date trees is regularly cleared. At the time of the experiments, there were no potential, attractive, sugar sources within a distance of at least 100 m from the experimental set-up.

Laboratory Experiments

Laboratory experiments were conducted in experimental cages or release-chambers in the insectary of the laboratory of Westham Ltd. The environmental conditions were: a temperature of 27° ° C. a relative humidity of 80%, and a photoperiod of 16:8 hours (light:dark).

Experimental Cages

Rectangular cages (120×60×60 cm, 0.432 m.$^3$) were made from metal frames covered with gauze, with two sleeved openings.

Release-Chambers

A room (4×7×3 m) having attractant and control bait located in two opposing corners, situated 1 meter from the abutting walls and at a height of 1 meter from the floor was used as a release chamber.

Traps Used for Evaluation of Attraction in Laboratory Studies

The attractant was placed in a 200 ml cup that was covered at its opening with yellow adhesive material (20×20 cm. Tangle Foot, Rimi. Petah Tiqwa, Israel) with the adhesive side exposed, facing outward. A hole in the center of the adhesive material allowed for evaporation and effusion of the attractant into the room. Flies (male and female) were released in the room in the afternoon hours after being starved for 24 hrs. Attractive performance of the attractant was based on the number of flies stuck to the adhesive material after an elapsed amount of time in the release chamber.

Flies Used for Testing in Laboratory Studies

Mosquitoes (*Culex pipiens*) and sand flies (*Phlebotomus papatasi*) were raised under common insectary conditions (i.e., 27° C., relative humidity 80%, and photoperiod of 16:8 hours light:dark) in the insectary of Westham Ltd. The flies used for the experiments were males and females between five and ten days old. The flies had access to a 10% sucrose-in-water solution that was changed daily, but received no blood meals before the tests. Prior to the experiments, flies were starved for 12 hrs. All flies were discarded after being used in a single experiment (i.e., no repeated use of experimental flies).

Date-Derived Syrup Products Used for the Experiments

The dates, date paste, and/or date syrup used for the date-derived syrup products in the experiments were obtained from commercial suppliers; the commercial materials contained multiple varieties of dates. Initial experiments were conducted which showed no variability in attractive performance based on the source of the date-derived syrup products (i.e., dates vs. date paste vs. "homemade" date syrup vs. commercial date syrup).

The date-derived syrup products were mixed in water to create suitable solutions for soaking sponges used in the experiments. A 10% sucrose solution prepared from white, refined sugar was used as a control. While the date-derived syrup products inherently contain natural sugars, and thus, can serve as fly bait by providing the flies with an energy source, the experiments focused primarily on the attractive performance of the date-derived syrup products.

Traps Used for Evaluation of Attraction in Field Studies

The attraction of date-derived syrup products was determined using a specially-designed glue trap, constructed as follows. Stiff (0.2-cm thick), dark green, plastic mesh (70× 70 cm.), having 0.8-cm. square holes, was rolled into cylinders that were tied with plastic strips to retain their shape. End covers for the cylinders were made from circular pieces of the same mesh. A sponge soaked with either attractant or control was fixed with two wooden stakes inside the center of each mesh cylinder. The cylinders were then closed with their covers, fixed to the ground with 20-cm. long, wooden stakes, and coated with an adhesive (Tangle Foot, Rimi. Petah Tiqwa, Israel) capable of capturing flies and non-target insects that were attracted to the attractants (for description in detail, see Müller et al., 2010).

General Set-Up of Field Studies

All field studies were conducted over several consecutive days and nights. The attractant-treated traps were placed 10 m. apart along an unpaved road that crossed the above-described plantation. In total, 10 samples of each type of attractant were tested for attraction in comparison to 10 controls.

Flies and other non-target insects caught on the glue traps were recovered daily after 24 hrs. at 15:00 and counted. Used attractants/controls were removed and fresh attractants/controls were inserted in the mesh cylinders following every collection, with fresh glue being applied to the cylinders as well. The order of the traps on the road was retained, but every day the entire line of attractant-treated traps was moved three steps in the same direction to avoid local bias.

General Set-Up of Laboratory Experiments 100 male and 100 female flies of the same species were released into a cage/release chamber in the evening (at 20:00), and allowed to settle for 30 min. The flies were then exposed to sponges soaked with attractants and controls.

Attractants were made from date-derived syrup products mixed with water in proportions of 100 g of products to 900 ml of water. Solution of 10% sucrose (from white, refined sugar) was used as the control. Food dyes were added as feeding markers; 1% W/V red dye and 1% W/V blue dye were added to experimental and control solutions, respectively. For the duration of the experiments, the experimental cages were kept inside the insectary.

After exposing the flies to attractant for a certain amount of time, the flies were recovered, and their abdomens were observed under a dissection microscope for the presence of imbibed, colored solutions. Attractant/control solutions were changed daily. For each fly species, there were ten repetitions per experiment.

Statistical Analysis

Statistical analysis was carried out using the GraphPad Prism 5.0 statistical package. Student's t-tests were used to compare the number of flies caught by each fruit-species attractant compared to the sucrose control. Significance was taken at $p<0.05$. Date-derived syrup products were ranked by being assigned an attraction index which was calculated by taking the average catch with the fruit-based attractant (AF) divided by the average catch with the sucrose solution-soaked sponge control (AC): AF/AC=Attraction Index or AI.

Experimental Results

Experiment I: Degree of Attraction of Flies on Different, Freshly-Prepared, Attractants in Experimental Cages Cohorts of 100 female and 100 male *Culex pipiens* were exposed in experimental cages to an attractant made from date syrup (either commercial products or syrup derived from dates or date paste), guava-based juice attractant (see Müller et al., 2010b), and 10% sucrose solution. Results after an exposure time of 30 minutes are presented in Table 1.

TABLE 1

Degree of attraction of *Culex pipiens* after an exposure time of 30 minutes on different, fresh attractants in experimental cages

| Attractants/Repetitions | 1 | 2 | 3 | 4 | 5 | 6 | 7 | 8 | 9 | 10 | Total | Avg. % | Attraction Index * |
|---|---|---|---|---|---|---|---|---|---|---|---|---|---|
| Females | | | | | | | | | | | | | |
| Date-based | 35 | 29 | 41 | 62 | 51 | 48 | 73 | 39 | 56 | 45 | 479 | 47.90 | 2.83 |
| Guava-based | 21 | 30 | 24 | 35 | 19 | 40 | 28 | 14 | 34 | 42 | 287 | 28.70 | 1.7 |
| Sucrose 10% | 12 | 19 | 11 | 8 | 23 | 15 | 9 | 28 | 30 | 14 | 169 | 16.90 | //// |
| Males | | | | | | | | | | | | | |
| Date-based | 37 | 35 | 55 | 69 | 50 | 57 | 75 | 36 | 63 | 51 | 528 | 52.80 | 2.8 |
| Guava-based | 25 | 30 | 29 | 42 | 21 | 45 | 24 | 20 | 35 | 48 | 319 | 31.90 | 1.67 |
| Sucrose 10% | 15 | 18 | 14 | 13 | 20 | 24 | 16 | 25 | 27 | 19 | 191 | 19.10 | //// |

* AI is based on comparison to 10% sucrose solution.

Results for *Culex pipiens* in experimental cages after an exposure time of 10 hours are presented in Table 2.

TABLE 2

Degree of attraction of *Culex pipiens* after an exposure time of 10 hours on different, fresh attractants in experimental cages.

| Attractants/Repetitions | 1 | 2 | 3 | 4 | 5 | 6 | 7 | 8 | 9 | 10 | Total | Avg. % | Attraction Index * |
|---|---|---|---|---|---|---|---|---|---|---|---|---|---|
| Females | | | | | | | | | | | | | |
| Date-based | 98 | 95 | 91 | 97 | 89 | 97 | 95 | 100 | 93 | 95 | 950 | 95.00 | 1.23 |
| Guava-based | 85 | 82 | 93 | 85 | 90 | 92 | 97 | 89 | 91 | 97 | 901 | 90.10 | 1.17 |
| Sucrose 10% | 67 | 90 | 76 | 81 | 77 | 86 | 85 | 73 | 64 | 72 | 771 | 77.10 | //// |
| Males | | | | | | | | | | | | | |
| Date-based | 96 | 93 | 98 | 100 | 95 | 92 | 99 | 97 | 89 | 90 | 949 | 94.90 | 1.21 |
| Guava-based | 88 | 85 | 79 | 81 | 85 | 78 | 92 | 95 | 87 | 91 | 861 | 86.10 | 1.09 |
| Sucrose 10% | 65 | 73 | 91 | 85 | 72 | 90 | 88 | 75 | 75 | 70 | 784 | 78.40 | //// |

* AI is based on comparison to 10% sucrose solution

Results for *Ph. papatasi* in experimental cages after an exposure time of 30 minutes are presented in Table 3.

TABLE 3

Degree of attraction of *Ph. papatasi* after an exposure time of 30 minutes on different, fresh attractants in experimental cages.

| Attractants/Repetitions | 1 | 2 | 3 | 4 | 5 | 6 | 7 | 8 | 9 | 10 | Total | Avg. % | Attraction Index * |
|---|---|---|---|---|---|---|---|---|---|---|---|---|---|
| Females | | | | | | | | | | | | | |
| Date-based | 19 | 23 | 34 | 17 | 32 | 25 | 31 | 40 | 27 | 45 | 293 | 29.30 | 3.61 |
| Guava-based | 10 | 14 | 19 | 20 | 16 | 9 | 26 | 18 | 30 | 17 | 179 | 17.90 | 2.21 |
| Sucrose 10% | 5 | 9 | 12 | 3 | 6 | 14 | 11 | 4 | 7 | 10 | 81 | 10.30 | //// |
| Males | | | | | | | | | | | | | |
| Date-based | 14 | 26 | 31 | 18 | 40 | 29 | 32 | 35 | 38 | 49 | 312 | 31.20 | 3.28 |
| Guava-based | 8 | 17 | 20 | 15 | 19 | 12 | 25 | 23 | 29 | 21 | 189 | 18.90 | 1.99 |
| Sucrose 10% | 7 | 10 | 15 | 5 | 9 | 11 | 13 | 3 | 15 | 7 | 95 | 12.40 | //// |

* AI is based on comparison to 10% sucrose solution

Results for *Ph. paparasi* in experimental cages after an exposure time of 10 hours are presented in Table 4.

TABLE 4

Degree of attraction of *Ph. papatasi* after an exposure time of 10 hours on different, fresh attractants in experimental cages.

| Attractants/Repetitions | 1 | 2 | 3 | 4 | 5 | 6 | 7 | 8 | 9 | 10 | Total | Avg. % | Attraction Index * |
|---|---|---|---|---|---|---|---|---|---|---|---|---|---|
| Females | | | | | | | | | | | | | |
| Date-based | 78 | 71 | 69 | 63 | 72 | 91 | 84 | 88 | 95 | 70 | 781 | 78.10 | 1.11 |
| Guava-based | 80 | 62 | 65 | 71 | 81 | 59 | 75 | 67 | 71 | 91 | 722 | 72.20 | 1.03 |
| Sucrose 10% | 57 | 85 | 72 | 60 | 64 | 74 | 81 | 55 | 80 | 73 | 701 | 70.10 | //// |
| Males | | | | | | | | | | | | | |
| Date-based | 74 | 78 | 62 | 70 | 80 | 85 | 96 | 92 | 87 | 81 | 805 | 80.50 | 1.18 |
| Guava-based | 68 | 81 | 83 | 65 | 72 | 75 | 84 | 71 | 90 | 83 | 772 | 77.20 | 1.13 |
| Sucrose 10% | 59 | 63 | 75 | 66 | 57 | 80 | 72 | 60 | 71 | 78 | 681 | 68.10 | //// |

* AI is based on comparison to 10% sucrose solution

Summary of results: In experimental cages, both female and male mosquitoes and sand flies exhibited significantly higher attraction on date-based attractant than on guava-based attractant after a time exposure of 30 min. Compared to the control (sucrose) attraction for both attractant formulations was significantly higher. After 10 hrs., the attraction rate on date-based attractant was still consistently higher than on guava-based attractant, although the results were not statistically significant. The date-based attractant is characterized by significantly higher attraction rates than guava-based attractant within short time intervals of exposure based on AI.

Experiment II: Degree Attraction of Flies to Different, Freshly Prepared and Aged Attractants in Release Chambers Cohorts of 100 female and 100 male flies were exposed in release chambers to a date-derived syrup product, guava-based juice attractant, and 10% sucrose solution. Results after an exposure time of 30 minutes to different, freshly-prepared attractants are presented in Table 5.

TABLE 5

Degree of attraction of *Culex pipiens* after an exposure time of 30 minutes on different, freshly-prepared attractants in release chambers.

| Attractants/Repetitions | 1 | 2 | 3 | 4 | 5 | 6 | 7 | 8 | 9 | 10 | Total | Avg. % | Attraction Index * |
|---|---|---|---|---|---|---|---|---|---|---|---|---|---|
| Females | | | | | | | | | | | | | |
| Date-based | 14 | 27 | 11 | 19 | 13 | 25 | 22 | 15 | 19 | 32 | 197 | 19.70 | 13.13 |
| Guava-based | 5 | 12 | 5 | 6 | 10 | 5 | 8 | 2 | 9 | 4 | 66 | 6.60 | 4.4 |
| Sucrose 10% | 0 | 2 | 1 | 0 | 1 | 0 | 1 | 3 | 0 | 7 | 15 | 1.50 | //// |

TABLE 5-continued

Degree of attraction of *Culex pipiens* after an exposure time of 30 minutes on different, freshly-prepared attractants in release chambers.

| Attractants/Repetitions | 1 | 2 | 3 | 4 | 5 | 6 | 7 | 8 | 9 | 10 | Total | Avg. % | Attraction Index * |
|---|---|---|---|---|---|---|---|---|---|---|---|---|---|
| Males | | | | | | | | | | | | | |
| Date-based | 17 | 25 | 16 | 26 | 15 | 19 | 16 | 17 | 27 | 38 | 216 | 21.60 | 12.71 |
| Guava-based | 6 | 10 | 3 | 9 | 8 | 5 | 10 | 6 | 11 | 15 | 83 | 8.30 | 4.88 |
| Sucrose 10% | 2 | 1 | 0 | 2 | 0 | 0 | 0 | 5 | 1 | 6 | 17 | 1.70 | //// |

* AI is based on comparison to 10% sucrose solution

Results for *Culex pipiens* in release chambers after an exposure time of 10 hours to different, freshly-prepared attractants are presented in Table 6.

TABLE 6

Degree of attraction of *Culex pipiens* after an exposure time of 10 hours on different, freshly-prepared attractants in release chambers.

| Attractants/Repetitions | 1 | 2 | 3 | 4 | 5 | 6 | 7 | 8 | 9 | 10 | Total | Avg. % | Attraction Index * |
|---|---|---|---|---|---|---|---|---|---|---|---|---|---|
| Females | | | | | | | | | | | | | |
| Date-based | 98 | 95 | 91 | 97 | 89 | 97 | 95 | 100 | 93 | 95 | 950 | 95.00 | 2.83 |
| Guava-based | 85 | 82 | 93 | 85 | 90 | 92 | 97 | 89 | 91 | 97 | 901 | 90.10 | 1.7 |
| Sucrose 10% | 67 | 90 | 76 | 81 | 77 | 86 | 85 | 73 | 64 | 72 | 771 | 77.10 | //// |
| Males | | | | | | | | | | | | | |
| Date-based | 96 | 93 | 98 | ## | 95 | 92 | 99 | 97 | 89 | 90 | 949 | 94.90 | 2.8 |
| Guava-based | 88 | 85 | 79 | 81 | 85 | 78 | 92 | 95 | 87 | 91 | 861 | 86.10 | 1.67 |
| Sucrose 10% | 65 | 73 | 91 | 85 | 72 | 90 | 88 | 75 | 75 | 70 | 784 | 78.40 | //// |

* AI is based on comparison to 10% sucrose solution

Results for female *Culex pipiens* in release chambers after an exposure time of 30 minutes to different, freshly-prepared and aged attractants are presented in Table 7.

TABLE 7

Degree of attraction of female *Culex piptens* after an exposure time of 30 minutes on different, freshly-prepared and aged attractants in release chambers.

| Attractants/Repetitions | 1 | 2 | 3 | 4 | 5 | 6 | 7 | 8 | 9 | 10 | Total | Avg. % | Attraction Index * |
|---|---|---|---|---|---|---|---|---|---|---|---|---|---|
| Females | | | | | | | | | | | | | |
| Date-based: fresh | 10 | 8 | 15 | 15 | 17 | 13 | 29 | 34 | 21 | 11 | 173 | 17.30 | 14.41 |
| Date-based: 2 wks | 5 | 11 | 17 | 8 | 24 | 19 | 27 | 13 | 20 | 16 | 160 | 16.00 | 13.33 |
| Date-based: 4 wks | 12 | 9 | 20 | 26 | 18 | 11 | 14 | 19 | 25 | 32 | 186 | 18.60 | 15.5 |
| Date-based: 10 wks | 33 | 14 | 5 | 3 | 14 | 18 | 22 | 13 | 21 | 12 | 155 | 15.50 | 12.92 |
| Date-based: 16 wks | 20 | 17 | 12 | 6 | 9 | 24 | 37 | 31 | 15 | 29 | 200 | 20.00 | 16.67 |
| Guava-based: fresh | 11 | 4 | 9 | 2 | 7 | 8 | 17 | 5 | 3 | 6 | 72 | 7.20 | 6 |
| Guava-based: 2 wks | 5 | 15 | 19 | 21 | 8 | 4 | 3 | 6 | 3 | 5 | 89 | 8.90 | 7.42 |
| Guava-based: 4 wks | 5 | 4 | 3 | 10 | 7 | 9 | 8 | 4 | 13 | 2 | 65 | 6.50 | 5.42 |
| Guava-based: 10 wks | 2 | 0 | 3 | 1 | 0 | 2 | 5 | 1 | 3 | 1 | 18 | 1.80 | 1.5 |
| Guava-based: 16 wks | 1 | 0 | 0 | 0 | 2 | 1 | 3 | 1 | 0 | 0 | 8 | 0.80 | 0.67 |
| Sucrose 10%: fresh | 0 | 1 | 0 | 2 | 0 | 1 | 3 | 0 | 1 | 2 | 10 | 1.00 | 0.83 |
| Sucrose 10%: 2 wks | 3 | 1 | 3 | 2 | 4 | 1 | 2 | 4 | 1 | 5 | 26 | 2.60 | 3 |

TABLE 7-continued

Degree of attraction of female *Culex piptens* after an exposure time of 30 minutes on different, freshly-prepared and aged attractants in release chambers.

| Attractants/Repetitions | 1 | 2 | 3 | 4 | 5 | 6 | 7 | 8 | 9 | 10 | Total | Avg. % | Attraction Index * |
|---|---|---|---|---|---|---|---|---|---|---|---|---|---|
| Sucrose 10%: 4 wks | 0 | 1 | 0 | 2 | 1 | 3 | 1 | 2 | 1 | 0 | 11 | 1.10 | 0.92 |
| Sucrose 10%: 10 wks | 0 | 0 | 0 | 2 | 1 | 0 | 1 | 0 | 3 | 1 | 8 | 0.80 | 0.67 |
| Sucrose 10%: 16 wks | 0 | 1 | 2 | 0 | 0 | 0 | 3 | 1 | 2 | 4 | 13 | 1.30 | 1.08 |
| Plain water | 4 | 1 | 0 | 1 | 0 | 0 | 1 | 3 | 0 | 2 | 12 | 1.20 | //// |

* AI is based on comparison to plain water

Summary of Results: In release chambers, both female and male mosquitoes and sand flies exhibited significantly higher attraction on date-based attractants than on guava-based attractants after a time exposure of 30 min. for both freshly-prepared and aged attractants. Compared to the control (sucrose) attraction on both attractant formulations was significantly higher. After 10 hrs., the attraction rate on date-based was still consistently higher than on guava-based attractant, although the results were not statistically significant. The date-based attractant is characterized by a significantly higher attraction rates than guava-based attractant within short time intervals of exposure based on AI.

Field Studies: Degree of Attraction of Flies a Different, Freshly-Prepared and Aged Attractants in a Study Oasis Field studies were conducted in the study oasis described above. Results for *Anopheles sergentii* (female and male mosquitoes pooled) in the study oasis after an overnight exposure to different, freshly-prepared and aged attractants are presented in Table 8.

TABLE 8

Degree of attraction of *Anopheles sergentii* (female and male mosquitoes pooled) after an overnight exposure on different, freshly-prepared and aged attractants in a study oasis.

| Attractants/Repetitions | 1 | 2 | 3 | 4 | 5 | 6 | 7 | 8 | 9 | 10 | Total | Attraction Index* |
|---|---|---|---|---|---|---|---|---|---|---|---|---|
| Intact Ripe Fruits | | | | | | | | | | | | |
| Guava | 29 | 35 | 47 | 28 | 56 | 41 | 57 | 69 | 26 | 17 | 405 | 6.86 |
| Dates | 2 | 7 | 1 | 12 | 5 | 11 | 17 | 6 | 2 | 8 | 71 | 1.2 |
| Blended Ripe Fruits | | | | | | | | | | | | |
| Guava: fresh | 45 | 57 | 36 | 39 | 55 | 70 | 27 | 85 | 48 | 76 | 538 | 9.12 |
| Dates: fresh | 10 | 3 | 1 | 19 | 5 | 4 | 2 | 13 | 5 | 16 | 78 | 1.32 |
| Fruit Attractants | | | | | | | | | | | | |
| Guava: fresh | 87 | 104 | 66 | 73 | 128 | 111 | 76 | 190 | 142 | 90 | 1067 | 18.01 |
| Dates: fresh | 210 | 125 | 237 | 345 | 192 | 286 | 99 | 439 | 442 | 251 | 2626 | 44.51 |
| Guava: 10-wk field exp. | 10 | 6 | 11 | 17 | 8 | 5 | 19 | 10 | 15 | 7 | 108 | 1.83 |
| Dates: 10-wk field exp. | 255 | 149 | 93 | 317 | 180 | 125 | 269 | 336 | 164 | 350 | 2238 | 37.93 |
| Controls | | | | | | | | | | | | |
| Sucrose 10% fresh | 10 | 4 | 2 | 2 | 0 | 9 | 6 | 15 | 4 | 11 | 63 | 0.83 |
| Plain water | 6 | 1 | 2 | 8 | 4 | 2 | 13 | 9 | 11 | 3 | 59 | //// |

*AI is based on comparison to plain water

Results for *Aedes caspius* (female and male mosquitoes pooled) in the study oasis after an overnight exposure to different, freshly-prepared and aged attractants we presented in Table 9.

TABLE 9

Degree of attraction of *Aedes caspius* (female and male mosquitoes pooled) after an overnight exposure on different, freshly-prepared and aged attractants in a study oasis.

| Attractants/ Repetitions | 1 | 2 | 3 | 4 | 5 | 6 | 7 | 8 | 9 | 10 | Total | Attraction Index* |
|---|---|---|---|---|---|---|---|---|---|---|---|---|
| Intact Ripe Fruits | | | | | | | | | | | | |
| Guava | 9 | 14 | 13 | 20 | 11 | 27 | 36 | 28 | 31 | 15 | 204 | 5.37 |
| Dates | 3 | 7 | 1 | 1 | 6 | 2 | 5 | 3 | 8 | 1 | 37 | 0.94 |
| Blended Ripe Fruits | | | | | | | | | | | | |
| Guava: fresh | 15 | 36 | 67 | 51 | 26 | 40 | 31 | 75 | 21 | 53 | 415 | 10.92 |
| Dates: fresh | 6 | 2 | 1 | 11 | 3 | 7 | 3 | 1 | 12 | 7 | 53 | 1.4 |
| Fruit Attractants | | | | | | | | | | | | |
| Guava: fresh | 17 | 25 | 52 | 40 | 30 | 71 | 59 | 44 | 97 | 86 | 521 | 13.71 |
| Dates: fresh | 115 | 240 | 95 | 158 | 192 | 64 | 95 | 150 | 175 | 203 | 1487 | 39.14 |
| Guava: 10-wk field exp. | 20 | 11 | 7 | 13 | 5 | 21 | 4 | 15 | 6 | 10 | 112 | 2.95 |
| Dates: 10-wk field exp. | 142 | 112 | 74 | 260 | 128 | 87 | 52 | 161 | 248 | 105 | 1369 | 36.03 |
| Controls | | | | | | | | | | | | |
| Sucrose 10% fresh | 3 | 10 | 2 | 1 | 5 | 2 | 4 | 5 | 6 | 3 | 41 | 1.08 |
| Plain water | 5 | 4 | 1 | 0 | 7 | 5 | 2 | 5 | 8 | 1 | 38 | //// |

*AI is based on comparison to plain water

Results for *Ph. papatasi* (female and male sand flies pooled) in the study oasis after an overnight exposure to different, freshly-prepared and aged attractants are presented in Table 10.

TABLE 10

Degree of attraction of *Ph. papatasi* (female and male sand flies pooled) after an overnight exposure on different, freshly-prepared and aged attractants in a study oasis.

| Attractants/ Repetitions | 1 | 2 | 3 | 4 | 5 | 6 | 7 | 8 | 9 | 10 | Total | Attraction Index * |
|---|---|---|---|---|---|---|---|---|---|---|---|---|
| Intact Ripe Fruits | | | | | | | | | | | | |
| Guava | 35 | 45 | 17 | 9 | 21 | 10 | 13 | 24 | 19 | 23 | 216 | 10.8 |
| Dates | 8 | 0 | 5 | 3 | 2 | 1 | 0 | 0 | 5 | 2 | 26 | 1.3 |
| Blended Ripe Fruits | | | | | | | | | | | | |
| Guava: fresh | 21 | 15 | 10 | 8 | 25 | 18 | 32 | 17 | 9 | 13 | 168 | 8.4 |
| Dates: fresh | 5 | 3 | 7 | 1 | 0 | 2 | 0 | 0 | 1 | 4 | 23 | 1.15 |
| Fruit Attractants | | | | | | | | | | | | |
| Guava: fresh | 82 | 33 | 57 | 31 | 70 | 63 | 42 | 69 | 23 | 88 | 558 | 27.9 |
| Dates: fresh | 75 | 120 | 157 | 93 | 105 | 76 | 33 | 135 | 187 | 145 | 1126 | 56.3 |
| Guava: 10-wk field exp. | 3 | 5 | 10 | 14 | 2 | 1 | 7 | 3 | 0 | 5 | 50 | 2.5 |
| Dates: 10-wk field exp. | 150 | 96 | 45 | 184 | 135 | 70 | 167 | 68 | 81 | 57 | 1053 | 52.65 |
| Controls | | | | | | | | | | | | |
| Sucrose 10% fresh | 7 | 3 | 2 | 4 | 1 | 5 | 1 | 0 | 3 | 1 | 27 | 1.35 |
| Plain water | 5 | 1 | 2 | 0 | 0 | 3 | 1 | 2 | 4 | 2 | 20 | //// |

* AI is based on comparison to plain water

Non-target insects: Results for Lepidoptera (female and male moths pooled) in the study oasis after an overnight exposure to different, freshly-prepared and aged attractants are presented in Table 11.

TABLE 11

Degree of attraction of *Lepidoptera* (female and male moths pooled) after an overnight exposure on different, freshly-prepared and aged attractants in a study oasis.

| Attractants/Repetitions | 1 | 2 | 3 | 4 | 5 | 6 | 7 | 8 | 9 | 10 | Total | Attraction Index * |
|---|---|---|---|---|---|---|---|---|---|---|---|---|
| Intact Ripe Fruits | | | | | | | | | | | | |
| Guava | 25 | 14 | 31 | 9 | 17 | 12 | 39 | 45 | 56 | 21 | 269 | 22.42 |
| Dates | 2 | 5 | 1 | 0 | 0 | 2 | 4 | 1 | 3 | 1 | 19 | 1.58 |
| Blended Ripe Fruits | | | | | | | | | | | | |
| Guava: fresh | 19 | 37 | 35 | 49 | 64 | 32 | 77 | 85 | 61 | 50 | 509 | 42.42 |
| Dates: fresh | 7 | 2 | 0 | 3 | 1 | 3 | 0 | 0 | 5 | 7 | 28 | 2.33 |
| Fruit Attractants | | | | | | | | | | | | |
| Guava: fresh | 227 | 245 | 64 | 90 | 73 | 102 | 185 | 206 | 145 | 110 | 1447 | 120.58 |
| Dates: fresh | 5 | 0 | 6 | 9 | 4 | 10 | 3 | 2 | 7 | 1 | 47 | 3.92 |
| Guava: 10-wk field exp. | 5 | 34 | 51 | 69 | 18 | 73 | 25 | 11 | 30 | 8 | 324 | 27 |
| Dates: 10-wk field exp. | 2 | 7 | 3 | 0 | 1 | 0 | 0 | 3 | 1 | 2 | 19 | 1.58 |
| Controls | | | | | | | | | | | | |
| Sucrose 10% fresh | 2 | 0 | 0 | 3 | 1 | 0 | 5 | 2 | 1 | 1 | 15 | 1.25 |
| Empty plate | 3 | 0 | 2 | 0 | 3 | 1 | 0 | 0 | 4 | 1 | 14 | 1.17 |
| Plain water | 4 | 1 | 0 | 1 | 0 | 0 | 1 | 3 | 0 | 2 | 12 | //// |

* AI is based on comparison to plain water

Non-target insects: Results for Hymenoptera (female and male wasps/bees pooled) in the study oasis after daytime exposure to different, freshly-prepared and aged attractants are presented in Table 12.

TABLE 12

Degree of attraction of *Hymenoptera* (female and male wasps/bees pooled) after daytime exposure on different, freshly-prepared and aged attractants in a study oasis.

| Attractants/Repetitions | 1 | 2 | 3 | 4 | 5 | 6 | 7 | 8 | 9 | 10 | Total | Attraction Index * |
|---|---|---|---|---|---|---|---|---|---|---|---|---|
| Intact Ripe Fruits | | | | | | | | | | | | |
| Guava | 19 | 27 | 15 | 30 | 52 | 18 | 5 | 21 | 40 | 38 | 265 | 53 |
| Dates | 1 | 0 | 0 | 0 | 2 | 1 | 3 | 1 | 0 | 2 | 10 | 2 |
| Blended Ripe Fruits | | | | | | | | | | | | |
| Guava: fresh | 44 | 25 | 10 | 48 | 75 | 29 | 36 | 64 | 50 | 92 | 473 | 94.6 |
| Dates: fresh | 4 | 1 | 0 | 0 | 3 | 1 | 0 | 0 | 0 | 2 | 11 | 2.2 |
| Fruit Attractants | | | | | | | | | | | | |
| Guava: fresh | 51 | 93 | 113 | 73 | 37 | 46 | 55 | 105 | 71 | 42 | 686 | 137.2 |
| Dates: fresh | 3 | 0 | 5 | 2 | 0 | 0 | 3 | 19 | 5 | 1 | 38 | 7.6 |
| Guava: 10-wk field exp. | 12 | 8 | 4 | 8 | 5 | 19 | 7 | 3 | 14 | 10 | 90 | 18 |
| Dates: 10-wk field exp. | 0 | 0 | 3 | 1 | 5 | 1 | 0 | 0 | 0 | 4 | 14 | 2.8 |
| Controls | | | | | | | | | | | | |
| Sucrose 10% fresh | 1 | 0 | 0 | 2 | 1 | 0 | 0 | 2 | 1 | 0 | 7 | 1.4 |

TABLE 12-continued

Degree of attraction of Hymenoptera (female and male wasps/bees pooled) after daytime exposure on different, freshly-prepared and aged attractants in a study oasis.

| Attractants/ Repetitions | 1 | 2 | 3 | 4 | 5 | 6 | 7 | 8 | 9 | 10 | Total | Attraction Index * |
|---|---|---|---|---|---|---|---|---|---|---|---|---|
| Empty plate | 0 | 0 | 0 | 0 | 1 | 1 | 0 | 0 | 1 | 5 | 8 | 1.6 |
| Plain water | 1 | 0 | 1 | 2 | 0 | 0 | 0 | 0 | 1 | 0 | 5 | //// |

* AI is based on comparison to plain water

Summary of results: In field studies in the study oasis, both mosquitoes and sand flies exhibited significantly higher attraction on fruit-based guava attractants (i.e., intact ripe fruit and blended ripe fruit) than on fruit-based date attractants after an overnight exposure, while date-based syrup attractants (as compared to guava-based juice attractants) yielded a significantly higher AI for freshly-prepared and aged attractants. With regard to attraction discrimination of non-target insects (e.g., moths, wasps, and bees), date-based attractants performed significantly better as compared to guava-based attractants by yielding substantially lower AIs for non-target insects in the field-study data.

The results from the experimental and field studies described above indicate, inter alia, attractants prepared from date-derived syrup products are significantly better for attracting flies, while selectively discriminating non-target insects by exhibiting poor attraction to such unintended targets.

Bait Stations Comprising Date-Derived Syrup Products

Bait stations can be made from a substrate material that is used to support the date-derived syrup products and optionally, a protective, semi-permeable, piercable film, which encloses the date-derived syrup products. Suitable substrate materials and protective films to assist in preventing erosion, sagging, and cold flow of the date-derived syrup products as well as lowering surface tack.

Substrate materials can be mechanically-roughened materials (e.g., reinforced cardboard and plastic) as well as materials constructed to have high surface area (e.g., woven functional fabrics and meshes, open-pore foams, fibrous mats, corrugated materials, and "honeycomb" fabricated materials).

Furthermore, natural substrates can be found in the environments of the area in which one wants to utilize the attractants. For example, green vegetation and similar foliage that are non-flowering, or are utilized when they are not in their flowering phase (in order not to attract bees), are excellent substrates. Typically, such natural substrates have roughened or textured surfaces that are ideal for supporting such date-derived syrup products. In addition, such natural substrates eliminate any concern of generating any environmental waste by-product in the environment.

Protective films can be suitable polymeric materials (e.g., thermoplastics, thermosetting polymers, carbon black-filled butyl rubber, acrylic polymer, plasticized PVC, polyurethanes, neoprene, natural rubber, and butadiene rubber). Such materials may contain elastomers (e.g., polydimethyl siloxanes (PDMS), silicone rubbers, silicone elastomers, silicone gels, ethylene-vinyl acetate, ethylene-acrylic ester copolymers and terpolymers, ethylene-propylene rubber, plastomers such as ethylene-bexene and ethylene-octee copolymers, thermoplasic vulcanized rubber (TPV); hydrogenated block styrene-ethylene butylenes (SEBS); and block styrene isoprene (SIBS).

Such materials may further contain plasticizers (e.g., aliphatic polyesters) and light stabilizers (e.g., UV stabilizers), as well as other additives such as carbon black, pigments and dyes, fillers, and bactericides, fungicides, and other microbial-activity suppressants.

Such protective films assist in physically supporting the date-derived syrup products in to order to prevent sagging and cold flow, while allowing for effusion of the date-derived attractants.

While the present invention has been described with respect to a limited number of embodiments, it will be appreciated that many variations, modifications, and other applications of the present invention may be made.

LITERATURE

Dye, C. M., Guy, W., Elkins, D. B., Wilkes, & T. J. Killick-Kendrick, R., 1987. The life expectancy of phlebotomine sand flies: first field estimates from southern France. Med. Vet. Entomol. 1: 417-425.

Foster. W. A., 1995. Mosquito sugar feeding and reproductive energetics. Annu. Rev. Entomol. 40: 443-474.

Gibb. P. A., Anderson, J. C. & Dye. C., 1988. Are nulliparous flies light shy? Trans. R. Soc. Trop. Med. Hyg. 82: 342-343.

Killick-Kendrick, R., 1999. The biology and control of phlebotomine sand flies. Clinics in Dermatology, 17: 279-289.

MacVicker. J. A. K., Moore, J. S., Molyneux. D. H., & Maroli, M., 1990. Honeydew sugars in wild caught Italian phlebotomine sandflies (Diptera: Psychodidae) as detected by high performance liquid chromatography. Bull. Entomol. Res. 80: 339-344.

Müller. G. C. & Schlein, Y., 2004. Nectar and honeydew feeding of Phlebotomus papatasi in a focus of Leishmania major in Neot Hakikar oasis. J. Vector Ecol. 29: 154-158.

Müller, G. C. & Schlein, Y., 2006. Sugar questing mosquitoes in arid areas gather on scarce blossoms that can be used for control. Int. J. Parasitol. 36: 1077-1080.

Müller, G. C., Junnila, A., & Schlein, Y., 2010. Effective control of adult Culex pipiens by spraying an attractive toxic sugar bait solution in the vegetation near larval developmental sites. J. Med. Entomol. 47: 63-66.

Müller, G. C., Beier, J. C., Traore, S. F., Toure, M. B., Traore, M. M., Bah, S., Doumbia, S., & Schlein, Y., 2010a. Field experiments of Anopheles gambiae attraction to local fruits/seedpods and flowering plants in Mali to optimize strategies for malaria vector control in Africa using attractive toxic sugar bait methods. Malar. J., 9:262.

Müller. G. C., Beier. J. C., Traore, S. F., Toure, M. B., Traore, M. M., Bah. S., Doumbia. S., & Schlein, Y., 2010b. Successful field trial of attractive toxic sugar bait (ATSB) plant-spraying methods against malaria vectors in the Anopheles gambiae complex in Mali, West Africa. Malar. J., 9:210.

Schlecin, Y. & Muiller. G. C., 1995. Assessment of plant tissue feeding by sand flies (Diptera: Psychodidae) and mosquitoes (Diptera: Culicidae). J. Med. Entomol. 32: 882-88.

Schlein. Y. & Miller. G. C., 2008. An approach to mosquito control: Using the dominant attraction of flowering *Tamarix jordanis* trees against *Culex pipiens*. J. Med. Entomol. 45: 384-390.

Schlein, Y & Müller, G. C., 2010. Experimental control of *Phlebotomus papatasi* by spraying attractive toxic sugar bait (ATSB) on vegetation. Trans. Trop. Med. and Hyg. Accepted.

Wallbanks, K. R., Moore, J. S., Bennet. L. R., Soren, R., Molyneux, D. H., Carlin. J. M., & Perez, J. E., 1991. Aphid derived sugars in the neotropical sandfly *Lutzomyia peruensis*. Trop. Med. Parasitol. 42: 60-62.

What is claimed is:

1. A bait station for attracting biting flies, the bait station comprising:
   (a) a date-derived syrup product, adapted to exhibit sustained, long-term effectiveness, for attracting at least one type of biting fly selected from the group consisting of: mosquitoes, sand flies, stable flies, biting midges, and stomoxys, wherein said date-derived syrup product includes a syrup product derived from non-fermented fruit borne of the Genus Phoenix L. which includes the date palm, Family Arecaceae, the main species *Phoenix dactylifera* L., *P. atlantica* A. Chev., *P. canariensis* Chabeaud, *P. reclinata* Jacq., *P. sylvestris* Roxb., *P. humilis* Royle, *P. hanceana* Naudin, *P. robelinic* O'Brein, *P. farinifera* Roxb., *P. rupicola* T. Anders., *P. acaulis* Roxb., and *P. paludosa* Roxb., Canary Island date palm, Loureir's date palm, Senegal date palm, reclining date palm, pygmy date palm, wild date palm, and descendent species therein; and
   (b) a substrate material for supporting said date-derived syrup product.

2. The bait station of claim 1, the bait station further comprising:
   (c) a protective film for providing said at least one type of biting fly access to said date-derived syrup product.

3. The bait station of claim 2, wherein said protective film is adapted to be permeable to volatile components.

4. The bait station of claim 2, wherein said protective film is configured to be piercable by said at least one type of biting fly.

5. The bait station of claim 1, wherein said date-derived syrup product has a field-effectivity lifetime of greater than about 10 weeks based on attraction index retention of greater than about 70% of an original attraction index, wherein said original attraction index is defined as an average date-bait catch of said at least one type of biting fly with an original use of said date-derived syrup product divided by an average water-control catch of said at least one type of biting fly with plain water in a field environment as a designated geographic area.

6. The bait station of claim 1, wherein said date-derived syrup product is adapted to provide a discriminating ability to selectively attract said at least one type of biting fly concurrently with discriminately not attracting non-target sugar-feeding insects, wherein said discriminating ability is based on having an attraction index ratio of greater than about 5:1 of an average target attraction index of target biting flies relative to an average non-target attraction index of said non-target sugar-feeding insects, while in the presence of said non-target sugar-feeding insects, wherein said presence means that a target proximity of said date-derived syrup product in relation to said at least one type of biting fly and a non-target proximity of said date-derived syrup product in relation to said non-target sugar-feeding insects are approximately the same.

7. The bait station of claim 6, wherein said non-target sugar-feeding insects consist essentially of at least one type of sugar-feeding insect selected from the group consisting of: sugar-feeding bees, sugar-feeding wasps, sugar-feeding moths, related sugar-feeding insects of Lepidoptera order, and related sugar-feeding insects of Hymenoptera order.

8. The bait station of claim 1, wherein said date-derived syrup product is included at a concentration of at least about 10%.

9. A method for attracting biting flies, the method comprising the steps of:
   (a) providing a bait station including:
      (i) a date-derived syrup product, adapted to exhibit sustained, long-term effectiveness, for attracting at least one type of biting fly selected from the group consisting of: mosquitoes, sand flies, stable flies, biting midges, and stomoxys, wherein said date-derived syrup product includes a syrup product derived from non-fermented fruit borne of the Genus Phoenix L. which includes the date palm, Family Arecaceae, the main species *Phoenix dactylifera* L., *P. atlantica* A. Chev., *P. canariensis* Chabeaud, *P. reclinata* Jacq., *P. sylvestris* Roxb., *P. humilis* Royle, *P. hanceana* Naudin, *P. robelinic* O'Brein, *P. farinifera* Roxb., *P. rupicola* T. Anders., *P. acaulis* Roxb., and *P. paludosa* Roxb., Canary Island date palm, Loureir's date palm, Senegal date palm, reclining date palm, pygmy date palm, wild date palm, and descendent species therein; and
      (ii) a substrate material for supporting said date-derived syrup product; and
   (b) locating said bait station in a designated geographic area in order to attract said at least one type of biting fly.

10. The method of claim 9, wherein said bait station further includes:
    (iii) a protective film for providing said at least one type of biting fly access to said date-derived syrup product.

11. The method of claim 10, wherein said protective film is adapted to be permeable to volatile components.

12. The method of claim 10, wherein said protective film is configured to be piercable by said at least one type of biting fly.

13. The method of claim 9, wherein said bait station has a field-effectivity lifetime of greater than about 10 weeks based on an attraction index retention of greater than about 70% of an original attraction index, wherein said original attraction index is defined as an average date-bait catch of said at least one type of biting fly with an original use of said date-derived syrup product divided by an average water-control catch of said at least one type of biting fly with plain water in a field environment as said designated geographic area.

14. The method of claim 9, wherein said date-derived syrup product is adapted to provide a discriminating ability to selectively attract said at least one type of biting fly concurrently with discriminately not attracting non-target sugar-feeding insects, wherein said discriminating ability is based on having an attraction index ratio of greater than about 5:1 of an average target attraction index of target biting flies relative to an average non-target attraction index of said non-target sugar-feeding insects, while in the presence of said non-target sugar-feeding insects, wherein said presence means that a target proximity of said date-derived syrup product in relation to said at least one type of biting fly and a non-target proximity of said date-derived syrup product in relation to said non-target sugar-feeding insects are approximately the same.

15. The method of claim 14, wherein said non-target sugar-feeding insects consist essentially of at least one type of sugar-feeding insect selected from the group consisting of: sugar-feeding bees, sugar-feeding wasps, sugar-feeding moths, related sugar-feeding insects of Lepidoptera order, and related sugar-feeding insects of Hymenoptera order.

16. The method of claim 9, wherein said date-derived syrup product is included at a concentration of at least about 10%.

17. A method for attracting biting flies at a designated location, the method comprising the steps of:
(a) setting a location based on the presence of green vegetation or foliage; and
(b) applying a date-derived syrup product, adapted to exhibit sustained, long-term effectiveness, onto said green vegetation or foliage for attracting at least one type of biting fly selected from the group consisting of: mosquitoes, sand flies, stable flies, biting midges, and stomoxys, at the designated location, wherein said date-derived syrup product includes a syrup product derived from non-fermented fruit borne of the Genus Phoenix L. which includes the date palm, Family Arecaceae, the main species *Phoenix dactylifera* L., *P. atlantica* A. Chev., *P. canariensis* Chabeaud, *P. reclinata* Jacq., *P. sylvestris* Roxb., *P. humilis* Royle, *P. hanceana* Naudin, *P. robelinic* O'Brein, *P. farinifera* Roxb., *P. rupicola* T. Anders., *P. acaulis* Roxb., and *P. paludosa* Roxb., Canary Island date palm, Loureir's date palm, Senegal date palm, reclining date palm, pygmy date palm, wild date palm, and descendent species therein.

18. The method of claim 17, wherein said applying is at least one technique selected from the group consisting of: spraying, immersing, smearing, misting, pouring, and dripping.

19. The method of claim 17, wherein said date-derived syrup product has a field-effectivity lifetime of greater than about 10 weeks based on attraction index retention of greater than about 70% of an original attraction index, wherein said original attraction index is defined as an average date-bait catch of said at least one type of biting fly with an original use of said date-derived syrup product divided by an average water-control catch of said at least one type of biting fly with plain water in a field environment as said location.

20. The method of claim 17, wherein said date-derived syrup product is adapted to provide a discriminating ability to selectively attract said at least one type of biting fly concurrently with discriminately not attracting non-target sugar-feeding insects, wherein said discriminating ability is based on having an attraction index ratio of greater than about 5:1 of an average target attraction index of target biting flies relative to an average non-target attraction index of said non-target sugar-feeding insects, while in the presence of said non-target sugar-feeding insects, wherein said presence means that a target proximity of said date-derived syrup product in relation to said at least one type of biting fly and a non-target proximity of said date-derived syrup product in relation to said non-target sugar-feeding insects are approximately the same.

21. The method of claim 20, wherein said non-target sugar-feeding insects consist essentially of at least one type of sugar-feeding insect selected from the group consisting of: sugar-feeding bees, sugar-feeding wasps, sugar-feeding moths, related sugar-feeding insects of Lepidoptera order, and related sugar-feeding insects of Hymenoptera order.

* * * * *